US012597174B2

(12) United States Patent (10) Patent No.: US 12,597,174 B2
Sodagar (45) Date of Patent: Apr. 7, 2026

(54) METHOD AND APPARATUS FOR DELIVERING 5G AR/MR COGNITIVE EXPERIENCE TO 5G DEVICES

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 221 days.

(21) Appl. No.: 17/977,560

(22) Filed: Oct. 31, 2022

(65) Prior Publication Data
US 2023/0138606 A1 May 4, 2023

Related U.S. Application Data

(60) Provisional application No. 63/275,371, filed on Nov. 3, 2021.

(51) Int. Cl.
| *G06T 11/00* | (2006.01) |
| *G06T 7/70* | (2017.01) |
| *H04L 65/1069* | (2022.01) |
| *H04L 65/60* | (2022.01) |

(52) U.S. Cl.
CPC ............... *G06T 11/00* (2013.01); *G06T 7/70* (2017.01); *H04L 65/1069* (2013.01); *H04L 65/60* (2013.01)

(58) Field of Classification Search
CPC ....... G06T 11/00; G06T 7/70; H04L 65/1069; H04L 65/60; H04L 65/612; H04L 65/80; G06F 3/011; H04N 21/6587; H04N 21/816
See application file for complete search history.

(56) References Cited

U.S. PATENT DOCUMENTS

| 2018/0212845 A1* | 7/2018 | Eriksson ................. H04L 47/70 |
| 2021/0037250 A1 | 2/2021 | Makar et al. |
| 2021/0110610 A1 | 4/2021 | Xu et al. |

(Continued)

FOREIGN PATENT DOCUMENTS

CN 110399035 A * 11/2019 ......... G06F 3/04815

OTHER PUBLICATIONS

International Search Report dated Feb. 22, 2023 in Application No. PCT/US22/48653.

(Continued)

*Primary Examiner* — Kee M Tung
(74) *Attorney, Agent, or Firm* — Sughrue Mion, PLLC

(57) ABSTRACT

A method for delivering a $5^{th}$ generation (5G) augmented reality (AR)/mixed reality (MR) experience includes establishing an AR/MR session for streaming AR/MR media content for transmission over a 5G media streaming (5GMS) network; receiving an AR/MR media content update that is associated with a plurality of AR/MR scenes; iteratively receiving a respective AR/MR scene included in the plurality of AR/MR scenes; rendering the respective AR/MR scene; acquiring cognitive information and pose information corresponding to the respective AR/MR scene; and transmitting the cognitive information and the pose information to a cognitive immersive server while the AR/MR media content is streamed.

15 Claims, 14 Drawing Sheets

900

(56) References Cited

U.S. PATENT DOCUMENTS

| | | | |
|---|---|---|---|
| 2022/0030214 A1* | 1/2022 | Sinharoy | H04N 13/194 |
| 2022/0066543 A1* | 3/2022 | Rhyu | H04W 4/30 |
| 2022/0368762 A1* | 11/2022 | Yip | H04L 67/141 |
| 2024/0414415 A1* | 12/2024 | Bouazizi | H04L 65/80 |

OTHER PUBLICATIONS

Written Opinion of the International Searching Authority dated Feb. 22, 2023 in Application No. PCT/US22/48653.

3GPP TR 26.998 V1.0.3, $3^{rd}$ Generation Partnership Project; Technical Specification Group SA; Support of 5G Glass-type Augmented Reality/Mixed Reality (AR/MR) devise; (Release 17), Oct. 2021, pp. 1-92.

3GPP TS 26.501 V16.8.0, $3^{rd}$ Generation Partnership Project; Technical Specification Group Services and System Aspects; 5G Media Streaming (5GMS); General description and architecture (Release 16), Jun. 2021, pp. 1-79.

* cited by examiner

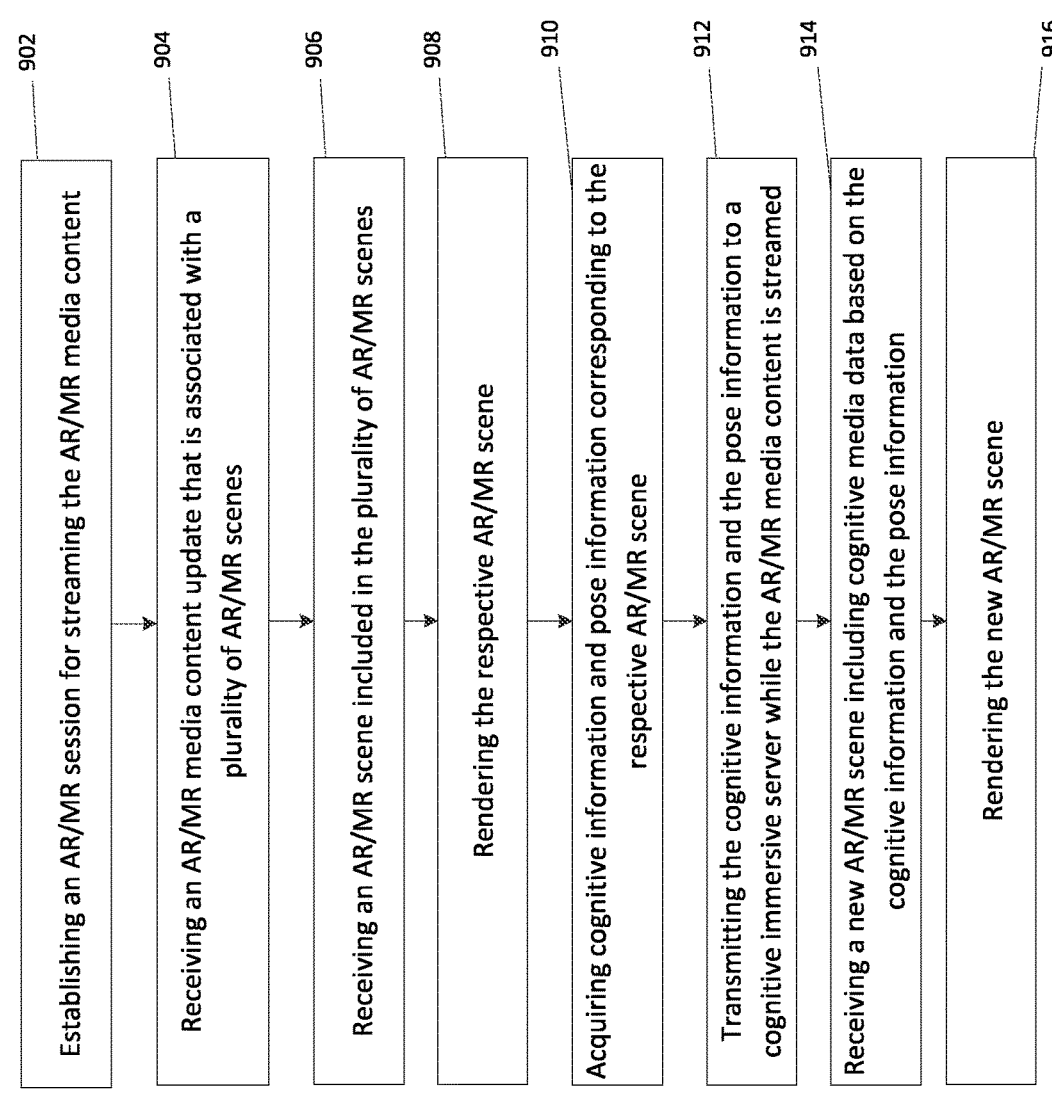

902 — Establishing an AR/MR session for streaming the AR/MR media content

904 — Receiving an AR/MR media content update that is associated with a plurality of AR/MR scenes 906 — Receiving an AR/MR scene included in the plurality of AR/MR scenes 908 — Rendering the respective AR/MR scene 910 — Acquiring cognitive information and pose information corresponding to the respective AR/MR scene 912 — Transmitting the cognitive information and the pose information to a cognitive immersive server while the AR/MR media content is streamed 914 — Receiving a new AR/MR scene including cognitive media data based on the cognitive information and the pose information 916 — Rendering the new AR/MR scene

METHOD AND APPARATUS FOR DELIVERING 5G AR/MR COGNITIVE EXPERIENCE TO 5G DEVICES

CROSS-REFERENCE TO RELATED APPLICATION

This application claims priority from U.S. Provisional Application No. 63/275,371, filed on Nov. 3, 2021, in the United States Patent and Trademark Office, the disclosure of which is incorporated herein by reference in its entirety.

FIELD

The disclosure generally relates to $5^{th}$ generation (5G) augmented reality (AR)/mixed reality (MR), and, in particular, to a method and apparatus for providing AR/MR content relating to cognitive experiences to 5G devices.

BACKGROUND

The 3rd Generation Partnership Project (3GPP) TS26.501 defines the media streaming architecture for $5^{th}$ generation (5G) networks. The 3GPP started a technical report on supporting augmented reality (AR)/mixed reality (MR) applications. 3GPP TR 26.998 defines the support for glass-type AR/MR devices in 5G networks. Two device classes are considered: devices that are fully capable of decoding and playing complex AR/MR content (i.e., stand-alone AR (STAR)), and devices that have smaller computational resources and/or smaller physical size (i.e., a smaller battery), and are only capable of running such applications if the larger portion of the computation is performed on 5G edge servers, networks, or clouds rather than on the device (edge dependent AR (EDGAR).

3GPP TR 26.998 defines a call flow for cognitive applications associated with STAR devices. However, the call flow is not efficient. Furthermore, the call flow for the EDGAR device is not provided.

SUMMARY

In accordance with an aspect of the disclosure, a method for delivering a 5th generation (5G) augmented reality (AR)/mixed reality (MR) experience includes establishing an AR/MR session for streaming AR/MR media content for transmission over a 5G media streaming (5GMS) network; receiving an AR/MR media content update that is associated with a plurality of AR/MR scenes; iteratively receiving a respective AR/MR scene included in the plurality of AR/MR scenes; rendering the respective AR/MR scene; acquiring cognitive information and pose information corresponding to the respective AR/MR scene; and transmitting the cognitive information and the pose information to a cognitive immersive server while the AR/MR media content is streamed.

In accordance with an aspect of the disclosure, a device for delivering a 5th generation (5G) augmented reality (AR)/mixed reality (MR) experience includes at least one memory configured to store program code; and at least one processor configured to read the program code and operate as instructed by the program code, the program code including: establishing code configured to cause the at least one processor to establish an AR/MR session for streaming AR/MR media content for transmission over a 5G media streaming (5GMS) network; first receiving code configured to cause the at least one processor to receive an AR/MR media content update that is associated with a plurality of AR/MR scenes; second receiving code configured to cause the at least one processor to iteratively receive a respective AR/MR scene included in the plurality of AR/MR media scenes; first rendering code configured to cause the at least one processor to render the respective AR/MR scene; acquiring code configured to cause the at least one processor to acquire cognitive information and pose information corresponding to the AR/MR scene; and transmitting code configured to cause the at least one processor to transmit the cognitive information and the pose information to a cognitive immersive server while the AR/MR media content is streamed.

In accordance with an aspect of the disclosure, a non-transitory computer-readable medium storing instructions, the instructions comprising: one or more instructions that, when executed by one or more processors of a device for delivering a 5th generation (5G) augmented reality (AR)/mixed reality (MR) experience, cause the one or more processors to: establish an AR/MR session for streaming the AR/MR media content for transmission over a 5G media streaming (5GMS) network; receiving an AR/MR media content update that is associated with a plurality of AR/MR scenes iteratively receive a respective AR/MR scene included in the plurality of AR/MR media scenes; render the respective AR/MR scene; acquire cognitive information and pose information corresponding to the respective AR/MR scene; and transmit the cognitive information and the pose information to a cognitive immersive server while the AR/MR media content is streamed.

BRIEF DESCRIPTION OF THE DRAWINGS

Further features, the nature, and various advantages of the disclosed subject matter will be more apparent from the following detailed description and the accompanying drawings in which:

FIG. 9 is a flowchart of a method for STAR-based 5G downlink streaming, according to embodiments.

DETAILED DESCRIPTION

Figure 1:
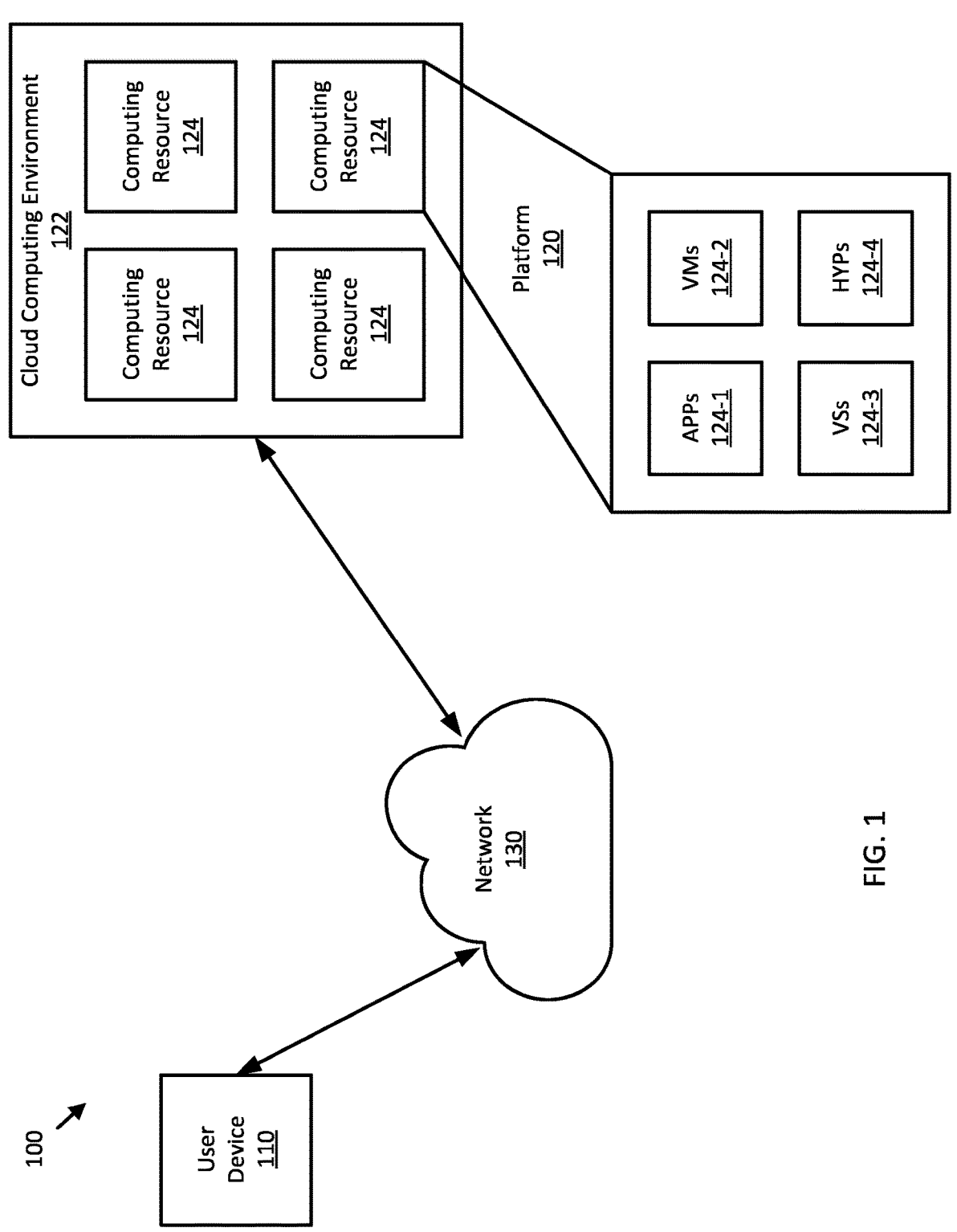
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
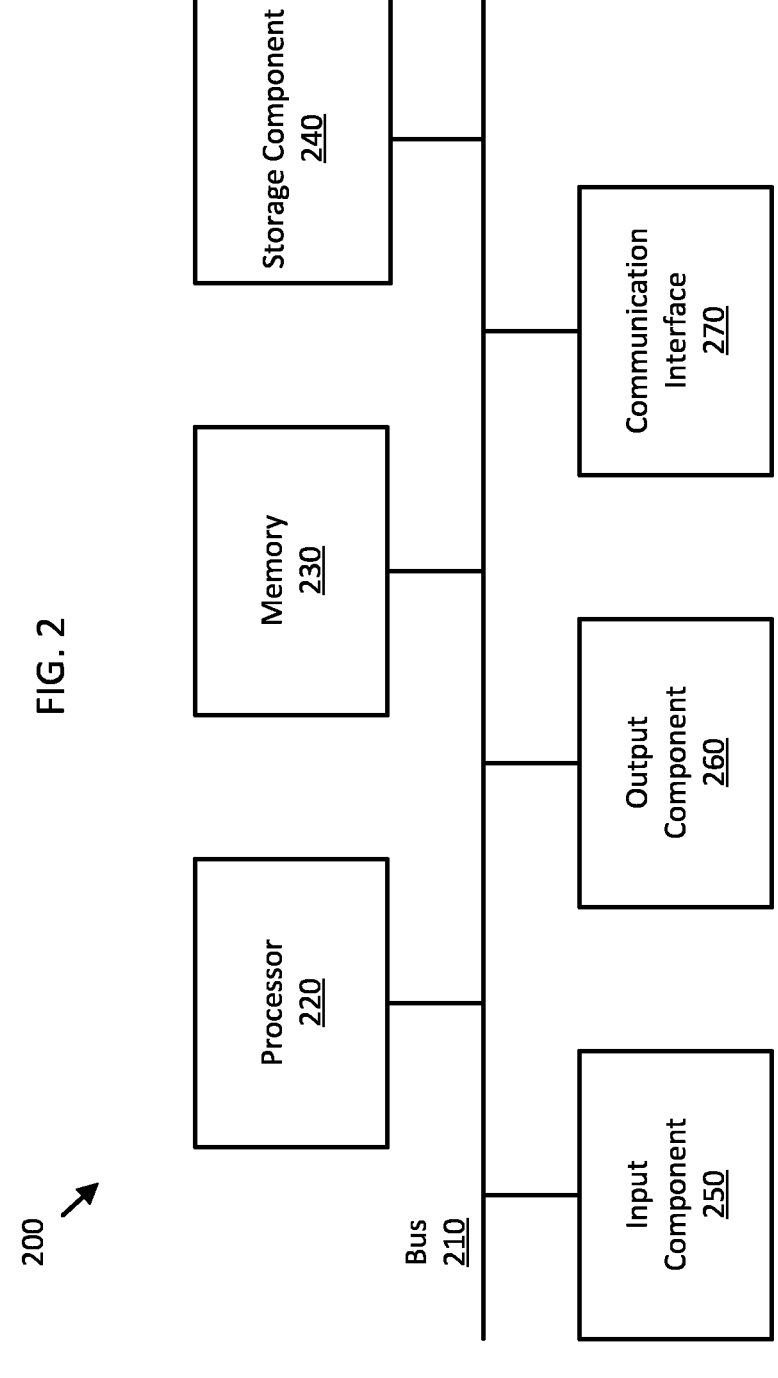
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/ Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/ NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (Mid) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
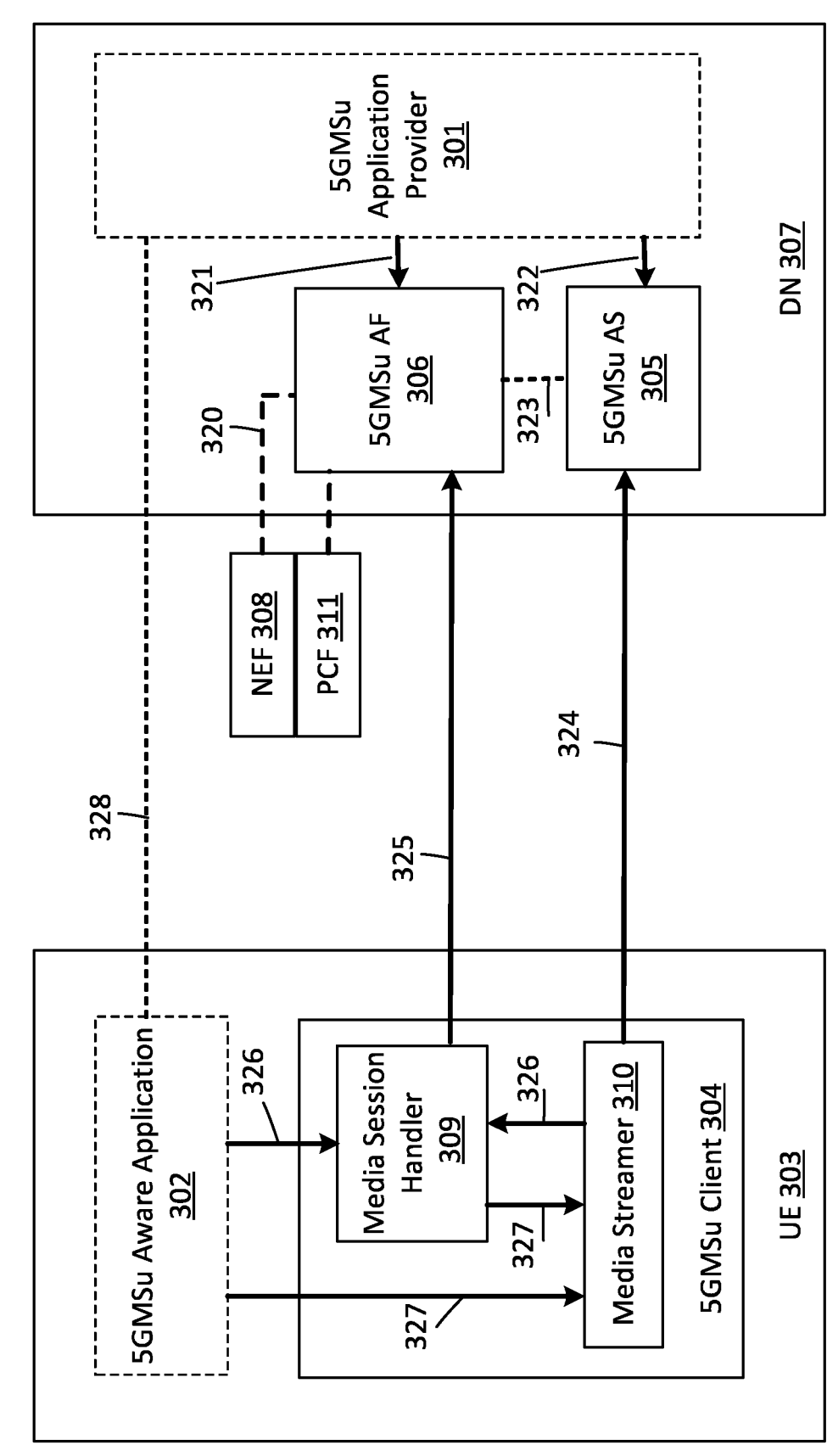
FIG. 3 is a diagram of a media architecture for media uplink streaming, according to embodiments.

FIG. 3 is a diagram of a media architecture 300 for media uplink streaming according to embodiments. A 5GMSu Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu AS may be an AS dedicated to 5G Media Uplink Streaming. 5GMSu Client 304 may be a UE 303 internal function dedicated to 5G Media Uplink Streaming.

5GMSu AF 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the NEF 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions and may be implemented as a content delivery network (CDN), for example. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different PCF 311 treatment or interact with other network functions.

Media architecture 300 may include a number of different interfaces. For example, link 321 may relate to M1u, may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302. The UE 303 may also be implemented in a self-contained manner such that interfaces M6u 326 and M7u 327 are not exposed.

Figure 4:
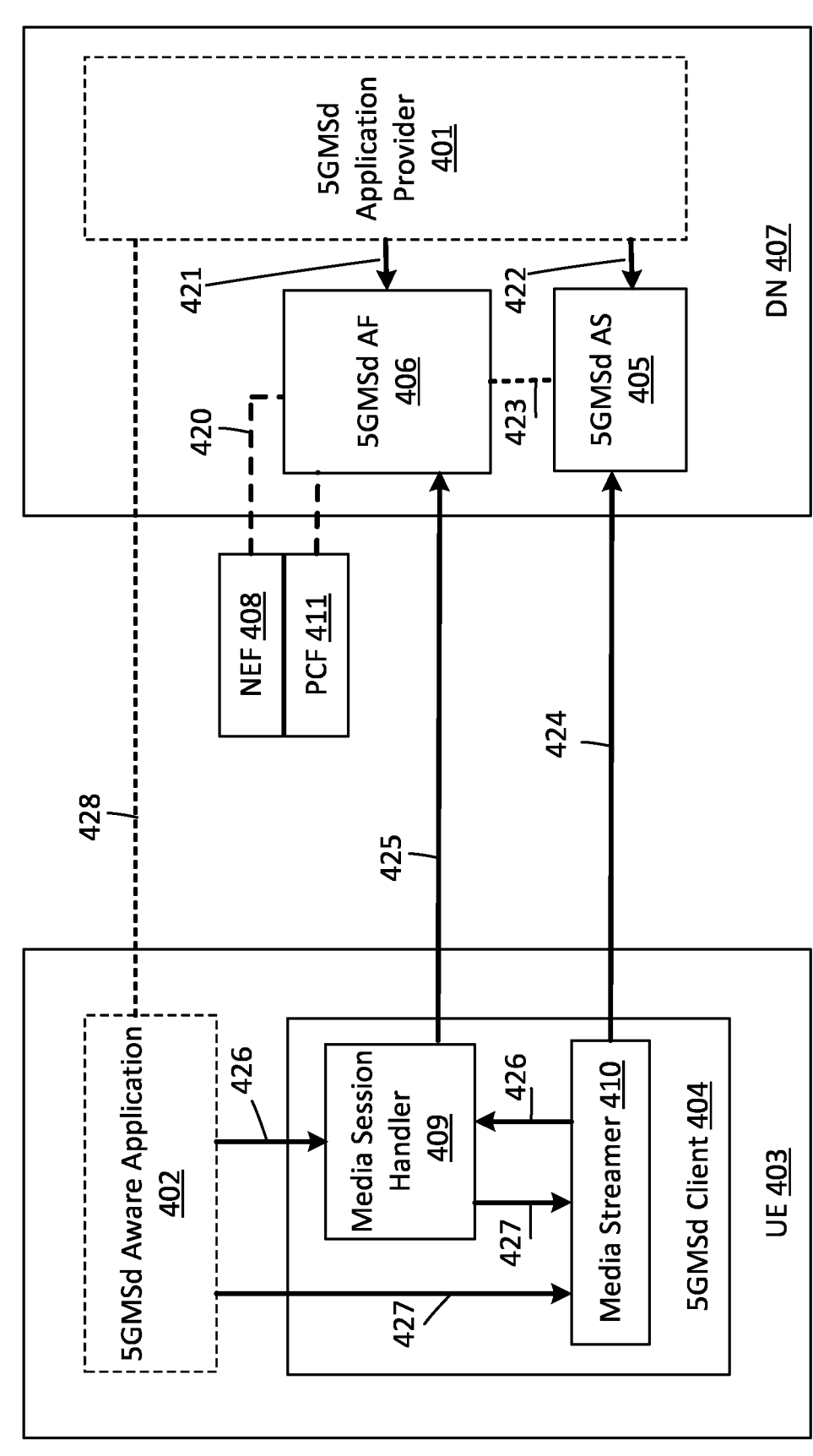
FIG. 4 is a diagram of a media architecture for media downlink streaming, according to embodiments.

FIG. 4 is a diagram of a media architecture 400 for media downlink streaming, according to embodiments. A 5GMSd Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd AS may be an AS dedicated to 5G Media Downlink Streaming. 5GMSd Client 404 may be a UE 403 internal function dedicated to 5G Media Downlink Streaming.

5GMSd AF 406 and 5GMSd AS 405 may be DN 407 functions. Functions in trusted DNs may be trusted by the operator's network. Therefore, AFs in trusted DNs may directly communicate with all 5G Core functions. Functions in external DNs may only communicate with 5G Core functions via the NEF 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 404 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different PCF 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

Figure 5:
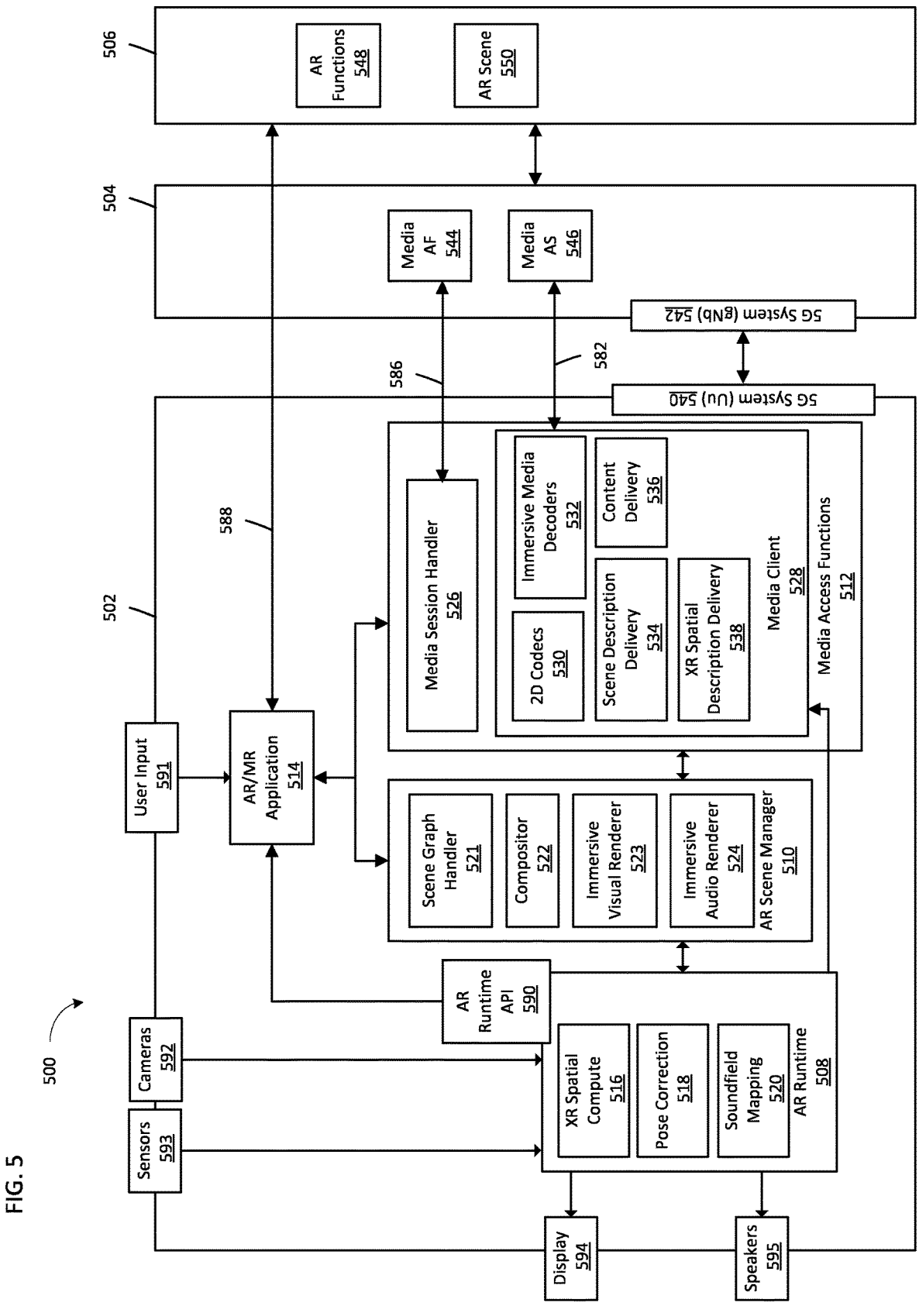
FIG. 5 is a diagram of a stand-alone augmented reality (AR) (STAR) 5th Generation media streaming downlink (5GMSd) download architecture, according to embodiments.

FIG. 5 is a diagram of a stand-alone augmented reality (AR) (STAR) 5GMSd download architecture 500, according to embodiments. The AR STAR 5GMSd architecture 500 may be applied to mixed reality (MR) as well. The architecture 500 includes a 5G STAR UE 502, a 5G system 504 (i.e., 5G server and computation), and an AR/MR application provider 506. The 5G STAR UE 502 includes an AR runtime 508, an AR scene manager 510, media access functions 512 and an AR/MR application 514. The AR runtime 508 includes an extended reality (XR) compute module 516, a pose correction module 518, and a soundfield mapping module 520. The AR scene manager 510 includes a scene graph handler (SGH) 521, a compositor 522, an immersive visual renderer 523 and an immersive audio renderer 524. The media access functions 512 include a media session handler 526 and a media client 528. The media client 528 includes two dimensional (2D) codecs 530, immersive media decoders 532, a scene description delivery module 534, a content delivery module 536, and an XR spatial description delivery module 538. The 5G STAR UE 502 includes a 5G system (Uu) 540 that is in communication with a 5G node (gNb) 542 of the 5G system 504.

The 5G system 504 includes a media AF 544 and a media AS 546. The AR/MR application provider 506 includes AR functions 548 and an AR scene module 550. The media client 528 is in communication with the media AS 546 by an M4 interface 582. The media session handler 526 is in communication with the media AF 544 by an M5 interface 586. The AR/MR application 514 is in communication with the AR/MR application provider 506 by an M8 interface 588. The AR/MR application 514 may receive a user input 591 and data of an AR runtime API 590 from the AR runtime 508. The AR runtime 508 may receive data from cameras 592 and sensors 593, and may output data to a display 594 and to speakers 595.

In embodiments, the architecture 500 may be operated using a call flow that includes two loops. For example, cognitive information from 5G STAR UE 502 may be delivered to the media AS 546 in the outer loop of the call flow, while the inner loop may be used to deliver for uplink streaming of the media objects from the 5G STAR UE 502 to the media AS 546 and downlink streaming of the media objects of the reconstructed scene from the media AS 546 to the 5G STAR UE 502.

In embodiments, one or more of the media client 528 and the media session handler 526 may be included in or referred to as a cognitive immersive client, and the media AF 544, the media AS 546, and one or more of the AR/MR application provider 506 may be included in or referred to as a cognitive immersive server.

Figure 6A:
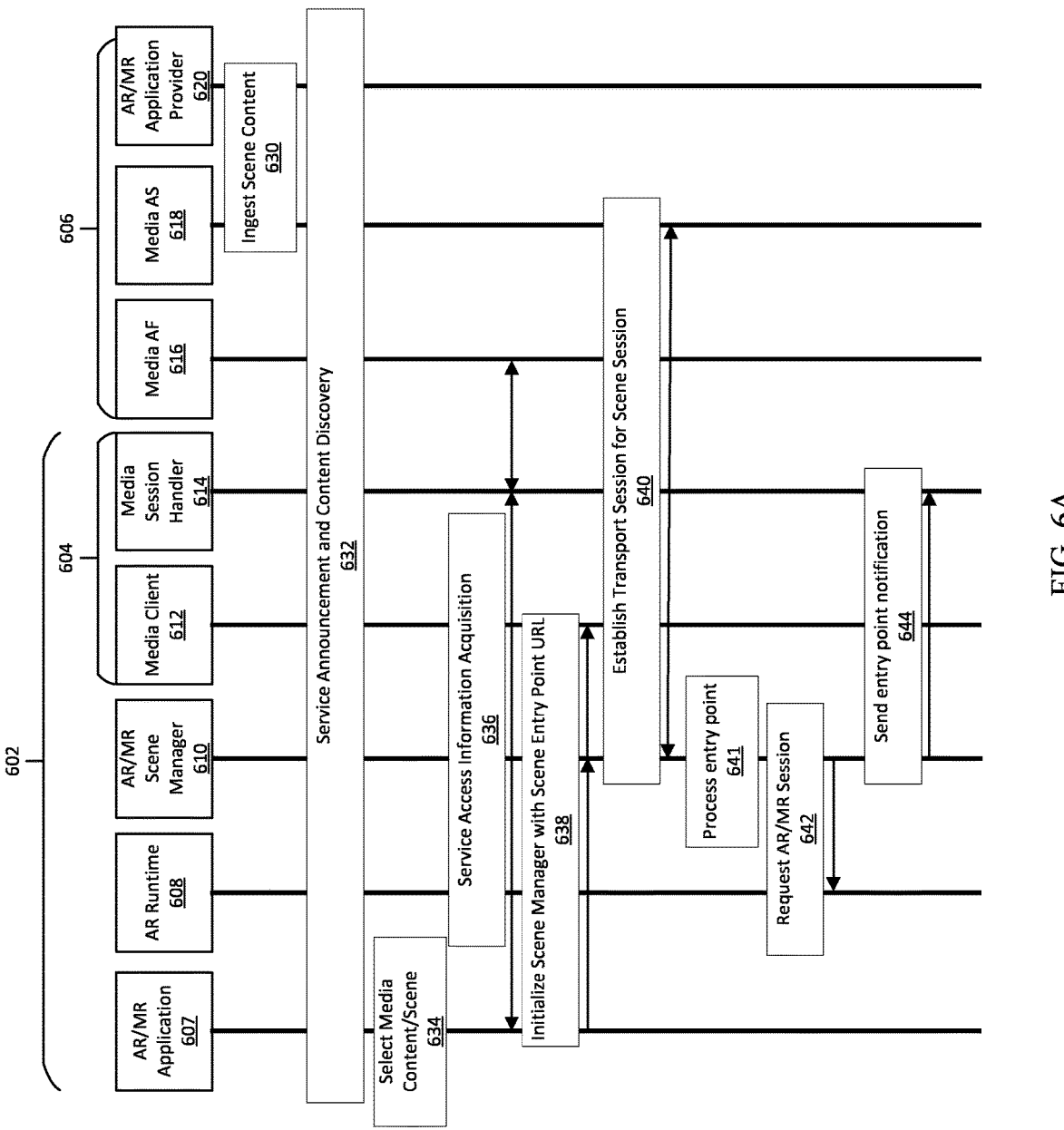
FIGS. 6A, 6B, and 6C are diagrams of an operation flow for STAR-based 5G downlink streaming, according to embodiments.
Figure 6B:
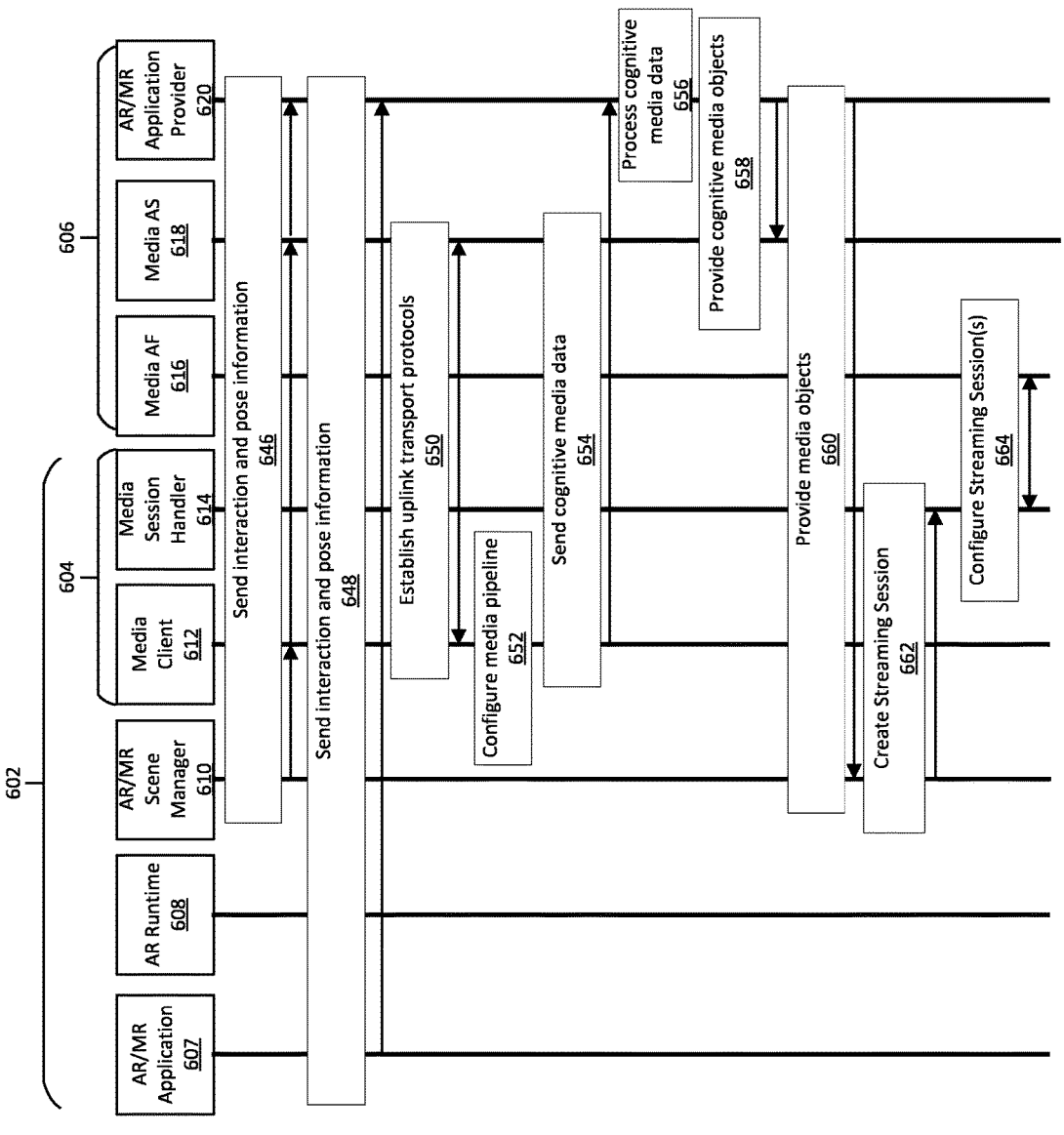
Figure 6C:
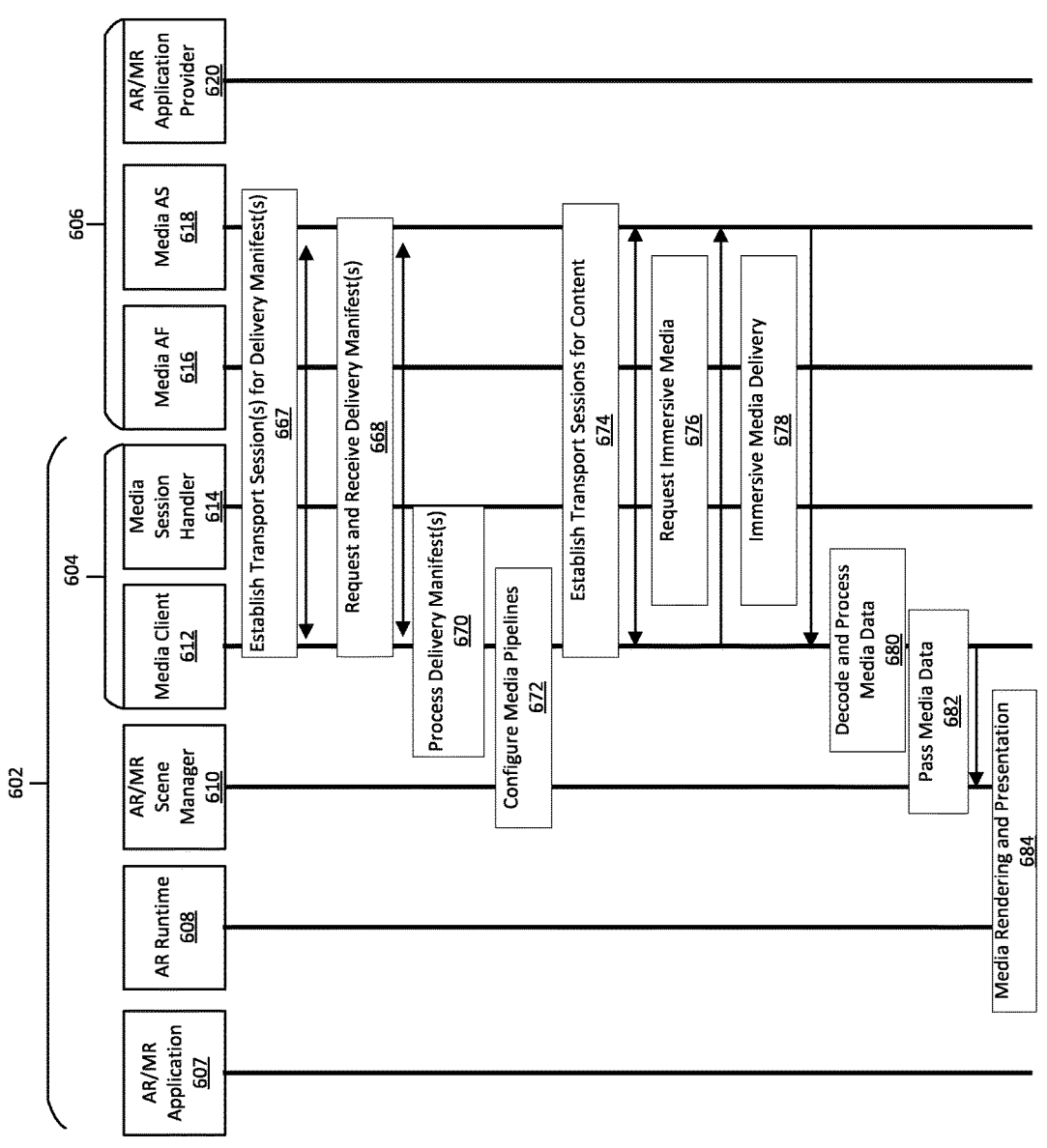

FIGS. 6A, 6B, and 6C are diagrams of an operation flow for STAR-based 5G downlink streaming, according to embodiments. The system performing the operation flow of FIG. 6 may include a AR/MR application 607, an AR runtime 608, an AR/MR scene manager 610, a media client 612, and a media session handler 614, which may be part of the STAR UE 602 (furthermore, the media client 612 and the media session handler 614 may be part of the media access functions). The system may also include a media AF 616 and a media AS 618. The system may also include an AR/MR application provider 620. The AR/MR application provider 620 may be referred to as a scene server.

In embodiments, these elements may correspond to one or more of elements discussed above with respect to FIG. 5. For example, in embodiments the STAR UE 602 may correspond to the 5G STAR UE 502, the AR/MR application 607 may correspond to the AR/MR application 514, the AR runtime 608 may correspond to the AR runtime 508, the AR/MR scene manager 610 may correspond to the AR scene manager 510, the media client 612 may correspond to the media client 528, the media session handler 614 may correspond to the media session handler 526, the media AF 616 may correspond to the media AF 544, the media AS 618 may correspond to the media AS 546, and the AR/MR application provider 620 may correspond to the AR/MR application provider 506. In embodiments, the media client 612 and the media session handler 614 may be included in or referred to as a cognitive immersive client 604, and the media AF 616, the media AS 618, and the AR/MR application provider 620 may be included in or referred to as a cognitive immersive server 606.

In operation 630, a scene server may be established, and scene content is ingested by the media AS 618. In operation 632, a service announcement and content delivery is triggered by the AR/MR application 607. The service access information includes the media client entry or a reference to the service access information is provided through the M8d interface. In operation 634, media content/scenes are selected. In operation 636, the service access information is acquired or updated as needed (i.e., operation 636 may be optional). In operation 638, the AR/MR application 607 initializes the AR/MR scene manager 610 with the entry point (i.e., the full scene description) URL.

In operation 640, the media client 612 establishes the transport session for the scene session between the AR/MR scene manager 610 and the scene server. In operation 641, the entry point, for example the scene description, is processed by the AR/MR scene manager 610, and a scene session is created. In operation 642, the AR/MR scene manager 610 requests the creation of a new AR/MR session from the AR runtime 608. In operation 644, the AR/MR scene manager sends the entry point notification to the media session handler 614, and the AR/MR session is created.

Operations 646-684 relate to an outer loop, which may be referred to as a scene session loop. In the scene session loop, cognitive and pose information are sent, and updated scenes are received and rendered.

In operation 646, the latest interaction and pose information is acquired by the AR/MR scene manager 610 and shared with the media client 612 through the M4d interface. The media client 612 sends this information to the media AS 618 and scene server. In operation 648, the latest cognitive data and additional interaction and pose information is acquired by the AR/MR application 607 and sent to the cognitive immersive server 606 through the M8d interface. In operation In operation 650, uplink transport protocols are established between the media client and media AS 618. In operation 652, the media client 612 configures the media pipeline for capturing and encoding uplink content. In operation 654, the media client 612 sends media AS 618 the cognitive media data, for example captured media. In operation 656, the cognitive immersive server 606 processes the cognitive data and creates the cognitive media and corresponding scenes. In embodiments, this cognitive processing may include, for example, semantical perception, spatial localization, and mapping. In operation 658, the cognitive immersive server 606 provides media objects, for example cognitive media objects, to the media AS 618.

In embodiments, the above operations 646-658 continue working during the below operations 660-684.

In operation 660, the scene server sends any scene updates or replaced scenes, for example including cognitive media objects, to the AR/MR scene manager through the media AS 618 and media client 612. For example, the scene updates or replaced scenes may be obtained based on a result of the cognitive processing, and may include cognitive media.

In operation 662, a streaming session is created. The media client 612 and/or the AR/MR scene manager 610 may provide the necessary quality of service (QoS) information to the media session handler 614. In operation 664, the streaming session(s) are configured. The media session handler 614 may share the information with the media AF 616, including the desired QoS information in some embodiments. Based on existing provisioning by the AR/MR application provider 620, the media AF 616 may request QoS modifications to the protocol data unit (PDU) session.

The streaming session, operations 667-674, establishes the transport sessions for media objects and configure the media pipelines. In operation 667, the transport sessions for delivery manifests are established. For the required media content, the media client 612 establishes the transport sessions to acquire delivery manifest information. In operation 668, the media client 612 requests and receives the delivery manifests from the media AS 618. In operation 670, the media client 612 processes the delivery manifests. The media client 612, for example, determines the number of needed transport sessions for media acquisition. The media client 612 is configured to use the delivery manifest information to initialize the media pipelines for each media stream.

In operation 672, the AR/MR scene manager 610 and the media client 612 configure the rendering and delivery media pipelines. In operation 674, the media client 612 establishes the transport sessions to acquire the media content.

Operations 676-684 establish a media session loop (e.g., the inner session loop) within the scene session loop (e.g., the outer session loop). The media session loop may operate to render and present media content while the outer loop establishes sessions and receives updates to the media content. The updates can be sent from the outer session loop to the inner session loop while the inner session loop is rendering content.

In operation 678, the media client 612 requests the immersive media data according to the processed delivery manifest. The media client 612 may account for the pose information (e.g., viewport dependent streaming). In operation 680, the media client 612 receives the immersive data and triggers the media rendering pipeline(s), including the registration of AR content into the real world, accordingly. In operation 682, the media client 612 decodes and processes the media data. For encrypted media data, the media client 612 may also perform decryption. In operation 684, the media client 612 passes the media data to the AR/MR scene manager 610. In operation 672, the AR/MR scene manager 610 renders the media and passes the rendered media to the AR runtime 608. The AR runtime 608 may perform further processing, such as registration of the AR content to the real world, pose correction, etc.

The AR/MR scene may be dynamically updated during the streaming to the STAR device and therefore the scenes can be changed completely during the streaming session. The scene updates for the STAR device are achieved with a double loop call flow, where, in the inner loop, the media objects of a scene are streamed while, in the outer loop, the scene is updated or changed. By the embodiments disclosed herein, whenever the scene is changed an updated, the inner loop is interrupted and the previous media object is replaced with the new media object relevant to the new scene and therefore no streaming bandwidth is wasted for media objects that are not relevant anymore in the new scene.

Figure 7A:
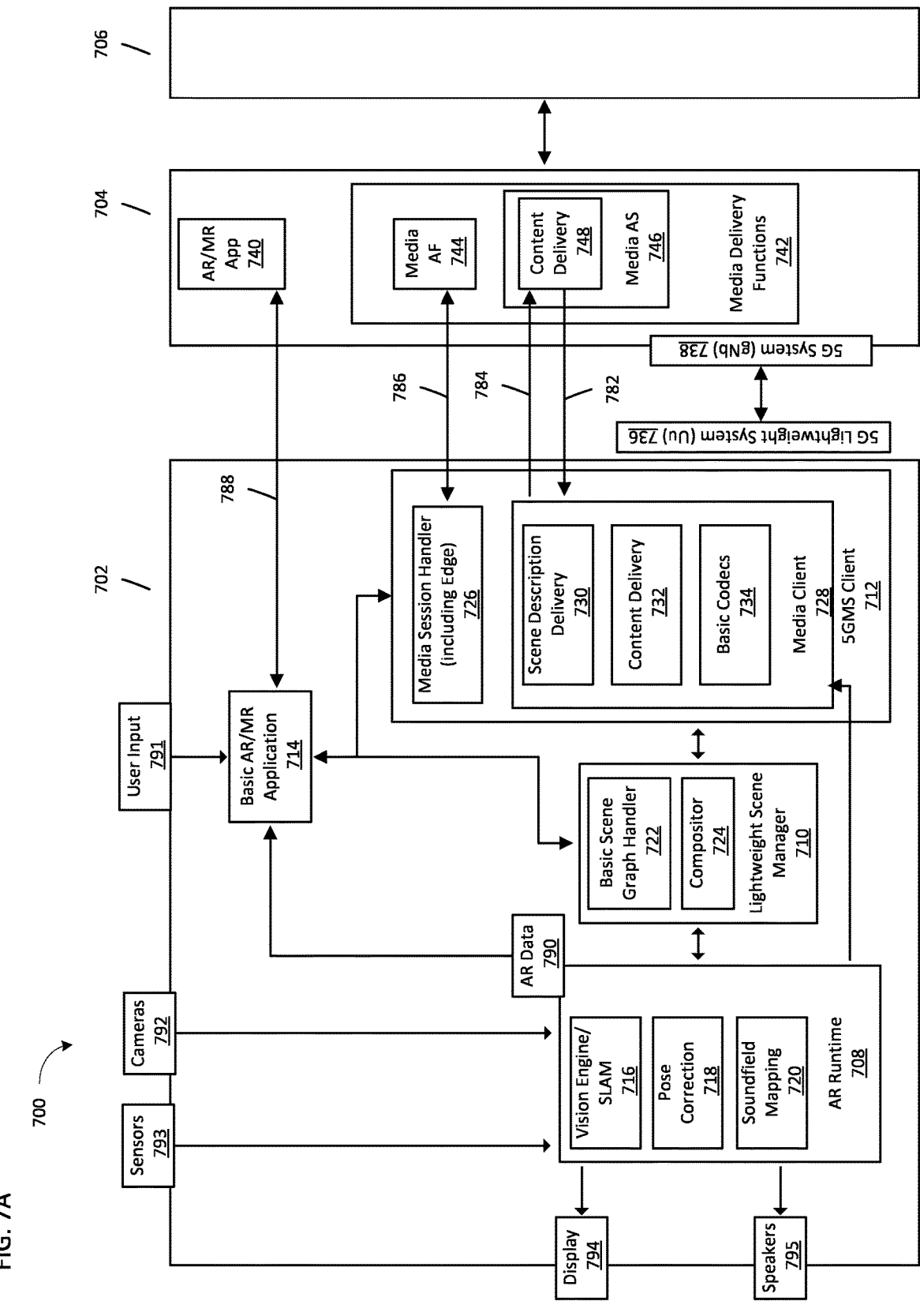
FIGS. 7A and 7B are diagrams of an edge dependent augmented reality (AR) (EDGAR) 5th Generation media streaming downlink (5GMSd) download architecture, according to embodiments.
Figure 7B:
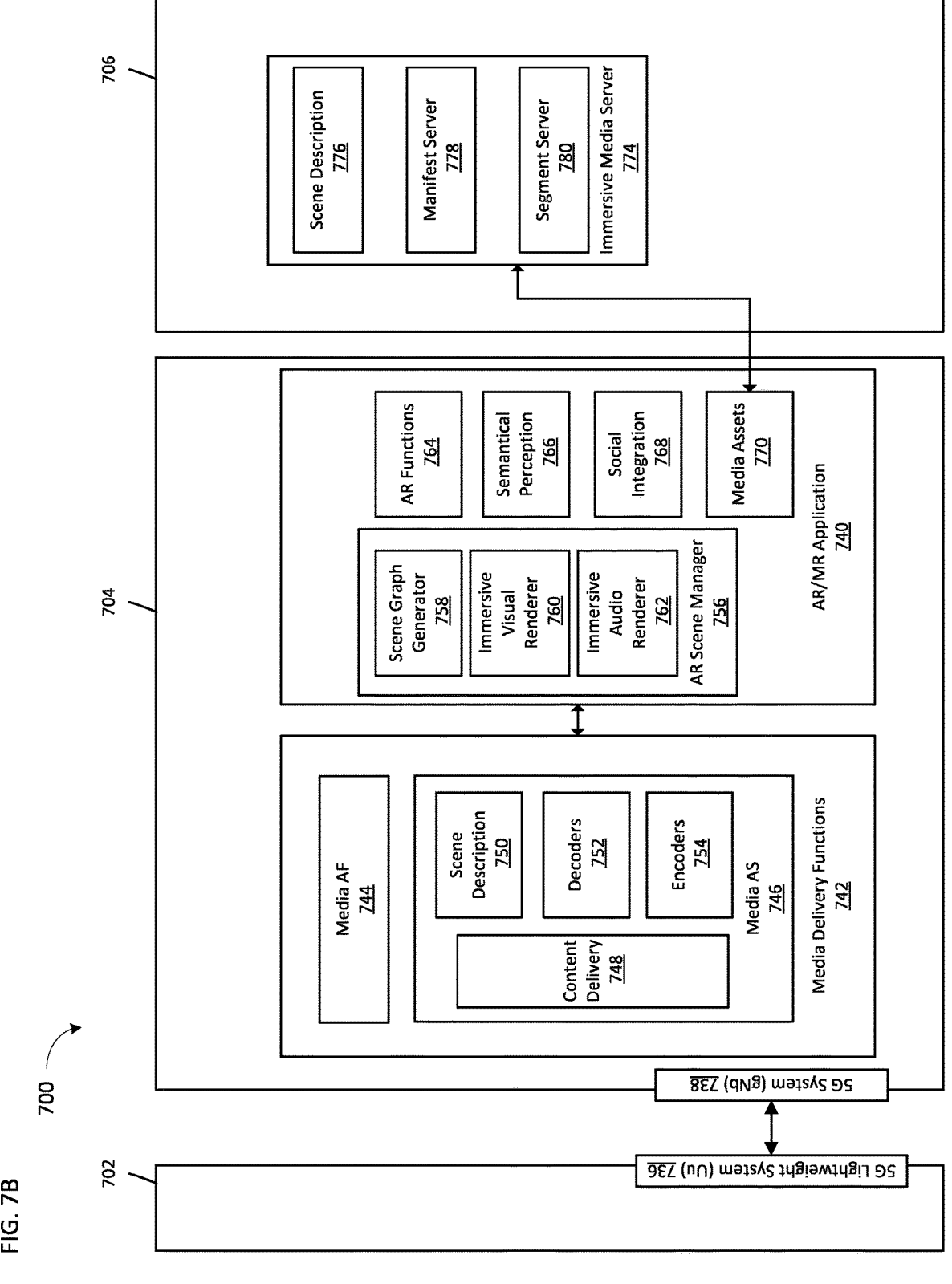

FIGS. 7A and 7B are diagrams of an edge dependent augmented reality (AR) (EDGAR) 5GMSd download architecture 700, according to embodiments. The AR EDGAR 5GMSd architecture 700 may be applied to mixed reality (MR) as well. The architecture 700 includes a 5G EDGAR UE 702, a cloud/edge server 704 and an AR/MR application provider 706. The 5G EDGAR UE 702 includes an AR runtime 708, a lightweight scene manager 710, a 5GMS client 712 and a basic AR/MR application 714. The AR runtime 708 includes a vision engine/simultaneous localization and mapping (SLAM) 716, a pose correction module

718, and a soundfield mapping module 720. The lightweight scene manager 710 includes a basic scene graph handler (SGH) 722 and a compositor 724. The 5GMS client 712 includes a media session handler (including an edge session) 726 and a media client 728. The media client 728 includes a scene description delivery module 730, a content delivery module 732 and basic codecs 734. The 5G EDGAR UE 702 includes a 5G lightweight system (Uu) 736 that is in communication with a 5G system (gNb) 738 of the cloud/edge server 704.

The cloud/edge server 704 includes an AR/MR application 740 and media delivery functions 742. The media delivery functions 742 include a media AF 744 and a media AS 746. The media AS 746 includes a content delivery function 748, a scene description function (SDF) 750, decoders 752 and encoders 754. The AR/MR application 740 includes an AR scene manager 756, AR functions 764, a semantical perception module 766, a social integration module 768, and a media assets database 770. The AR scene manager 756 includes a scene graph generator 758, an immersive visual renderer 760 and an immersive audio renderer 762.

The AR/MR application provider 706 includes an immersive media server 774. The immersive media server 774 includes a scene description module 776, a manifest server 778, and a segment server 780.

The media client 728 transmits to the content delivery module 748 by an M4 interface 782 (e.g., transmitting pose and interactions). The content delivery module 748 transmits to the media client 728 by an M4 interface 784 (e.g., transmitting pre-rendered media). The media session handler 726 is in communication with the media AF 744 by an M5d interface 786. The basic AR/MR application 714 is in communication with the AR/MR application 740 by an M8 interface 788. The basic AR/MR application 714 may receive a user input 791 and AR data 790 from the AR runtime 708. The AR runtime 708 may receive data from cameras 792 and sensors 793, and may output data to a display 794 and to speakers 795.

In embodiments, one or more of the media client 728 and the media session handler 726 may be included in or referred to as a cognitive immersive client, and the media AF 744, the media AS 746, and one or more of the AR/MR application provider 706 may be included in or referred to as a cognitive immersive server.

Figure 8A:
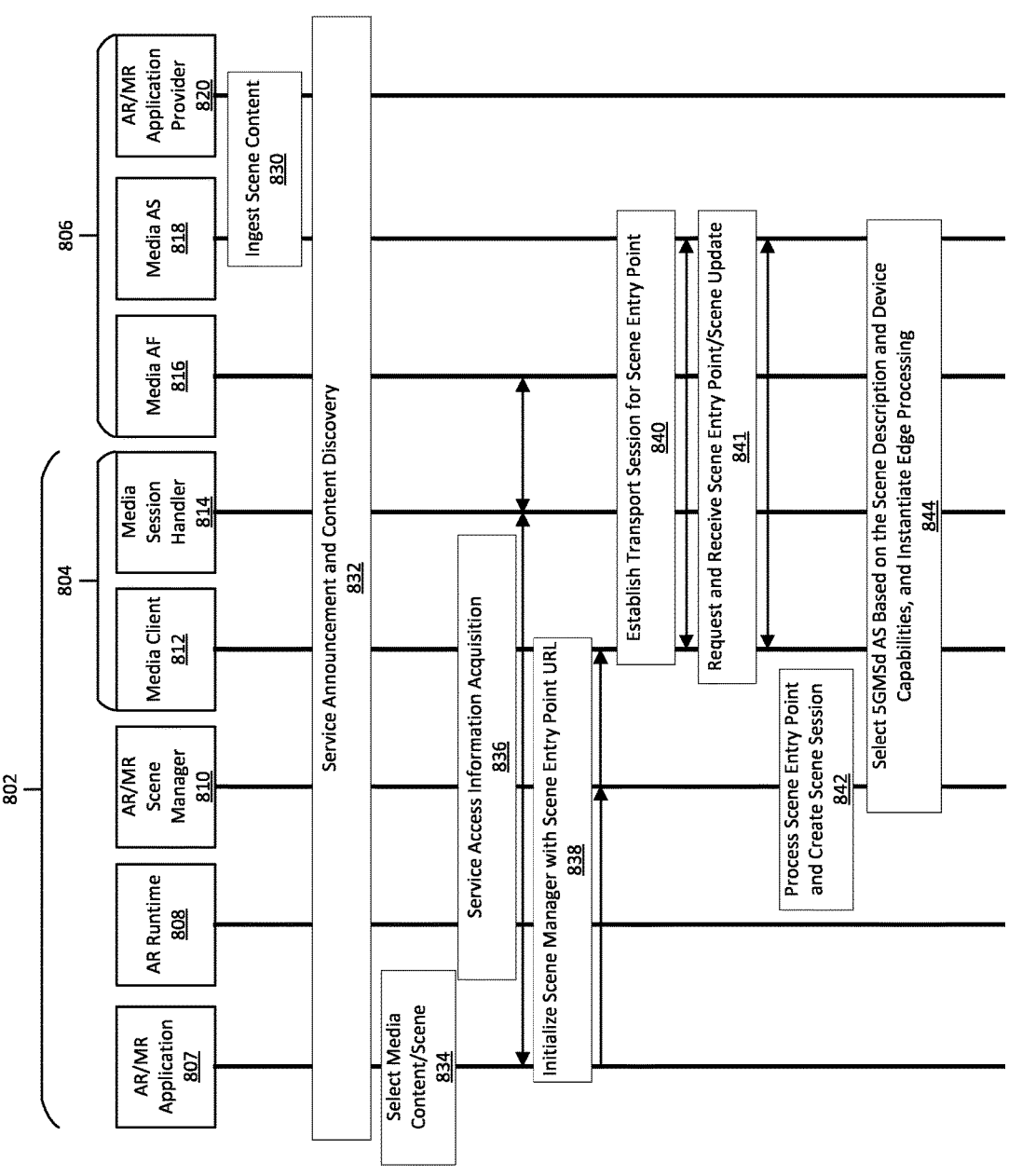
FIGS. 8A, 8B, and 8C are diagrams of an operation flow for EDGAR-based 5G downlink streaming, according to embodiments.
Figure 8B:
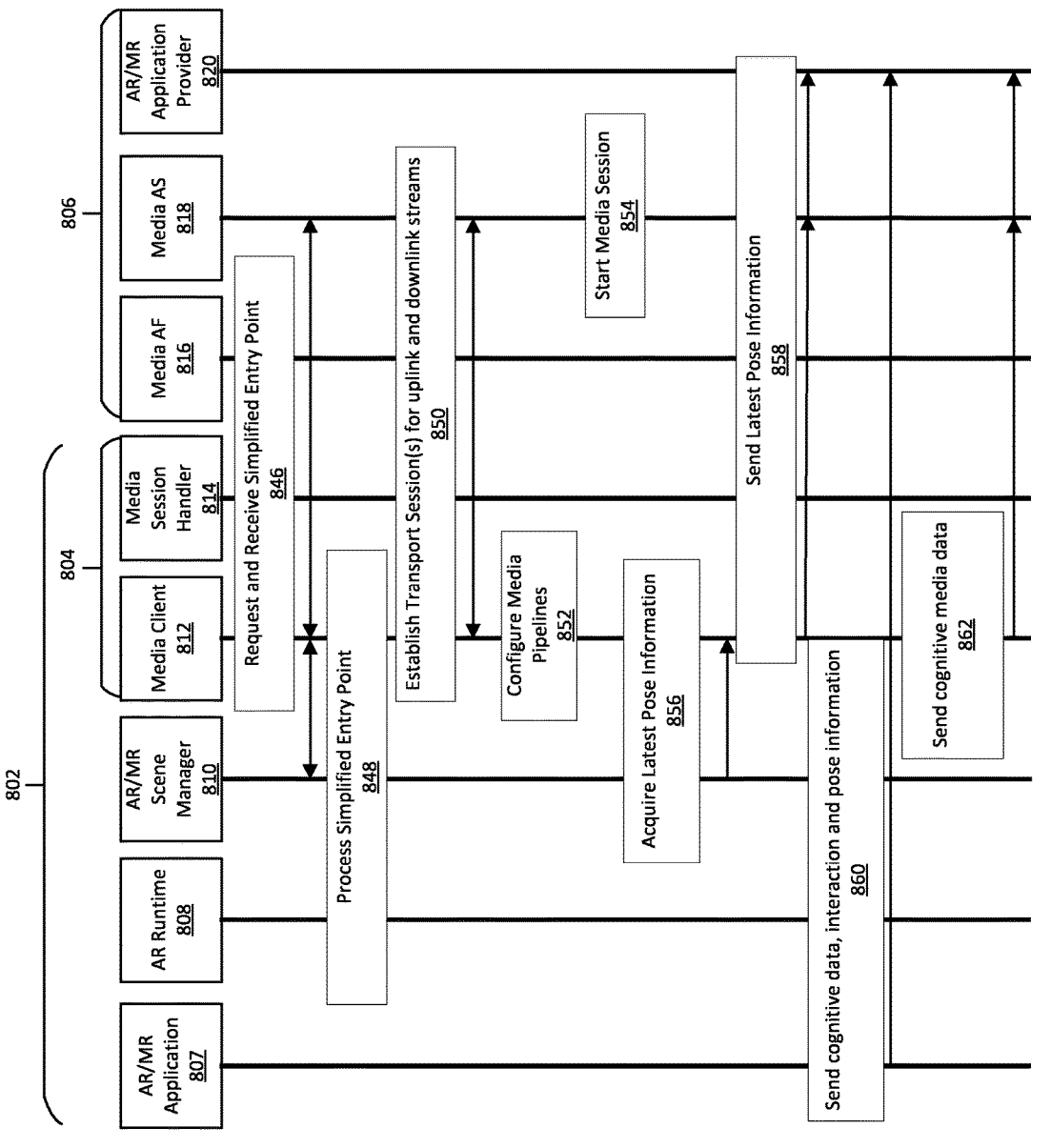
Figure 8C:
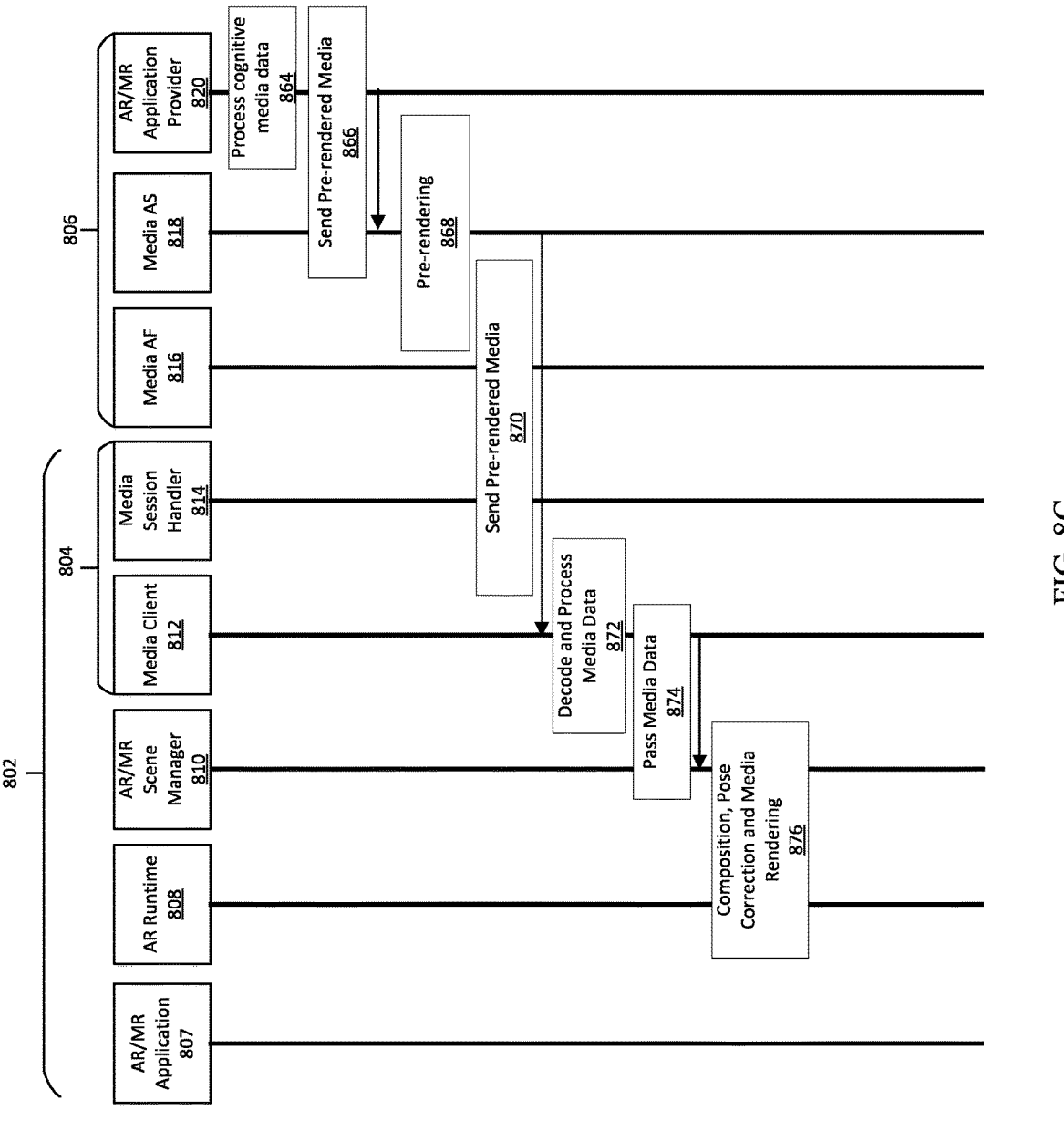

FIGS. 8A, 8B, and 8C are diagrams of an operation flow for EDGAR-based 5G downlink streaming, according to embodiments. The system performing the operation flow of FIGS. 8A-8C may include a basic AR/MR application 807, an AR runtime 808, an AR/MR scene manager 810, a media client 812, and a media session handler 814, which may be part of the EDGAR UE 802 (furthermore, the media client 812 and the media session handler 814 may be part of the media access functions). The system also includes a media AF 816, a media AS 818, which may be part of the cloud/edge server 704. The system may also include an AR/MR application provider 820. The AR/MR application provider 820 may be referred to as a scene server.

In embodiments, these elements may correspond to one or more of elements discussed above with respect to FIGS. 7A-7B. For example, in embodiments the EDGAR UE 802 may correspond to the 5G EDGAR UE 702, the basic AR/MR application 807 may correspond to the basic AR/MR application 714, the AR runtime 808 may correspond to the AR runtime 708, the AR/MR scene manager 810 may correspond to the lightweight scene manager 710, the media client 812 may correspond to the 5GMS client

712, the media session handler 814 may correspond to the media session handler 726, the media AF 816 may correspond to the media AF 744, the media AS 818 may correspond to the media AS 746, and the AR/MR application provider 820 may correspond to the AR/MR application provider 706. In embodiments, the media client 812 and the media session handler 814 may be included in or referred to as a cognitive immersive client 804, and the media AF 816, the media AS 818, and the AR/MR application provider 820 may be included in or referred to as a cognitive immersive server 806.

In operation 830, scene content is ingested by the media AS 818. In operation 832, a service announcement and content delivery is triggered by the basic AR/MR application 807. The service access information includes the media client entry or a reference to the service access information is provided through the M8d interface. In operation 834, media content/scenes are selected. In operation 836, the service access information is acquired or updated as needed (i.e., operation 836 may be optional). In operation 838, the basic AR/MR application 807 initializes the AR/MR scene manager 810 with the entry point (i.e., the full scene description) URL. In operation 840, the media client 812 establishes the transport session for receiving the entry point. In operation 841, the media client 812 requests and receives the entry point or an update to the scene description. In operation 842, the entry point is processed. As referred to herein, a scene description may be a data table that includes information on a scene, such as entry point, duration, resolution, bitrate, and/or other information related to a scene. A full scene description may include an entry point for the full scene, and a simplified scene description may include an entry point for the simplified scene. The full scene description may refer to an entry point at the beginning of the scene, and the simplified scene description may refer to an entry point for a portion of the full scene (e.g., the portion of the full scene may be the simplified scene). Thus, the simplified scene description may be derived based on the full scene description. For example, the full scene may include time points t0 through t4, and the full scene description may indicate that the entry point of the full scene is time point t0. The simplified scene may include the portion of the full scene from time point t2 to time point t3, and the simplified scene description may indicate that the that the entry point of the simplified scene is time point t2.

In operation 844, the system selects a media AS 818 based on the scene description and device capabilities, and instantiates edge processing. Based on the processed scene description and the device capabilities, the media AS 818 is selected, and edge processes are instantiated using the processes defined in the edge server 704. The AR/MR scene manager 810 may send the scene description and the device capabilities to the media AS 818. The media AS 818 derives the edge AS (EAS) key performance indicators (KPIs) and, if needed, selects a new AS/EAS (e.g., through the media AF 816) based on the new KPI. The edge processes are started and a new entry point URL is provided to the AR/MR scene manager 810. Alternative, in some embodiments, the AR/MR scene manager 810 may derive the EAS KPIs from the scene description and device capabilities, and request the media AF 816 to provide the list of suitable EASs. The AR/MR scene manager 810 may select the AS/EAS and request to start the edge processes in the AS (e.g., the selected AS may be the media AS 818). The edge processes are started, and a new entry point URL is provided to the AR/MR scene manager.

In operation 846, the AR/MR scene manager 810 requests the simplified scene entry point/scene description. The edge processes derive the simplified scene entry/description from the full scene description and provide it to the AR/MR scene manager. In operation 848, the simplified entry point (i.e., the simplified scene description) is processed.

In operation 850, the transport sessions for uplink and downlink streams are established. In operation 852, the media client 812 configures the uplink and downlink media pipelines. In operation 854, the media AS 818 initiates and starts a media session. The media session forms a stateful session loop specific to the UE (i.e., operations 856-876).

In operation 856, the latest interaction and pose information is acquired by the AR/MR scene manager 810 and shared with the Media Client 812. In operation 858, the media client 812 then sends the latest interaction and pose information which in turn sends it to the media AS 818 and scene server. In operation 860, the basic AR/MR application 807 sends the latest cognitive data and additional interaction and pose information to the cognitive immersive server 806 through the M8d interface. In operation 862, the media client 812 streams the cognitive media data through uplink transport to the media AS 818 and the scene server. In operation 864, the scene server creates or updates the scene description based on the received cognitive data. For example, the scene server may perform cognitive processing which may include, for example, semantical perception, spatial localization, and mapping. In operation 866, the scene server may provide updated media objects and scene description to the media AS 818. For example, the updated media objects may be obtained based on a result of the cognitive processing, and may include cognitive media.

In operation 868, the media client 812 may request immersive media, and the media AS 818 may perform pre-rendering of the media. Pre-rendering may include decoding and rendering immersive media and encoding the rendered (2D) media. In operation 870, the pre-rendered media is sent by the media AS 818 to the media client 812. In operation 872, the media client 812 passes decodes and processes the media data. For encrypted media data, the media client 812 may also perform decryption. In operation 880, the media client 812 passes the media data to the AR/MR scene manager 810. In operation 874, the AR/MR scene manager 810 renders the media and passes the rendered media to the AR runtime 808. The AR runtime 808 performs further processing, such as registration of the AR content to the real world, composition, and pose correction, at operation 876.

In embodiments, the cognitive information and media data of an AR/MR scene may be continuously dynamically updated during streaming to a STAR and/or EDGAR device and therefore the generated scenes can be changed completely during the streaming session.

In embodiments, cognitive information from the STAR device may be delivered to the application server in an outer loop of the call flow while an inner loop is used to deliver for uplink streaming of the media objects from the device to an application server and downlink streaming of the media objects of a reconstructed scene from the application server to the STAR device. Using this approach, whenever the cognitive information is fundamentally changed, such as a completely new location or scene, the inner loop may be interrupted and replaced with a media object relevant to the new scene and therefore no streaming bandwidth is wasted for media objects that are not relevant anymore in the new scene.

In embodiments, cognitive information updates for an EDGAR device to the device are part of the same loop as the media object streaming from an application server to the EDGE device where the scene updates occur at the media application server using the cognitive information and media data, and therefore the EDGAR device sees any scene update as a continuous part of the video streaming session.

Accordingly, embodiments may provide a method for delivering cognitive immersive experiences to AR/MR devices with an updatable scene, wherein the cognitive information and media objects are streamed to the application server and the scene is generated based on this information and streamed down to the device. In embodiments, both STAR devices and EDGAR devices may receive the updated immersive scene. In embodiments, for the STAR devices, the call flow may include a double loop where the outer loop the cognitive data is streamed up to the application server and the scene updates are streamed down to the device and in the inner loop the captured media object(s) are streamed up to the network while the media object of the constructed scene are streaming down to the device. In embodiments, for the EDGAR devices, the uplink and downlink streaming of the media objects occur in a single loop in which the application server constructs the scene description and media objects using the cognitive information and media objects that continuously receives from the device and provides a streaming video to the EDGAR device containing the overall AR/MR experience.

FIG. 9 is a flowchart of a process 900 for delivering a 5G AR/MR experience, according to embodiments.

In operation 902, the process 900 includes establishing an AR/MR session for streaming the AR/MR media content. In operation 904, the process 900 includes receiving an AR/MR media content update that is associated with a plurality of AR/MR scenes. In operation 906, the process 900 includes iteratively receiving a respective AR/MR scene included in the AR/MR media content. In operation 908, the process 900 includes rendering the respective AR/MR scene. In operation 910, the process 900 includes acquiring cognitive information and pose information corresponding to the respective AR/MR scene. In operation 912, the process 900 includes transmitting the cognitive information and the pose information to a cognitive immersive server while the AR/MR media content is streamed. In operation 914, the process 900 includes receiving a new AR/MR scene including cognitive media data based on the cognitive information and the pose information. In operation 916, the process 900 includes rendering the new AR/MR scene.

In embodiments, the cognitive media data may be generated by performing at least one of semantical perception, spatial localization, and mapping based on the cognitive information and the pose information.

In embodiments, the AR/MR media content may include standalone augmented reality (STAR) media content.

In embodiments, the AR/MR session may be created in an outer session loop, and the cognitive information and the pose information may be transmitted to the cognitive immersive server in the outer session loop.

In embodiments, the respective AR/MR scene may be rendered in an inner session loop within the outer session loop, and the respective AR/MR scene may be updated with the new AR/MR scene by providing the new AR/MR scene to the inner session loop while the inner session loop renders the AR/MR media content.

In embodiments, the AR/MR media content may include edge dependent AR (EDGAR) media content.

In embodiments, the AR/MR session may include a single loop in which the respective AR/MR scene is received, the cognitive information and the pose information are transmitted, and the new AR/MR scene is received.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for delivering a cognitive immersive experiences to augmented reality (AR)/mixed reality (MR) devices, the method comprising:
   receiving, by a Cognitive Immersive Server (CIS), captured media data that is associated with a plurality of scenes, the captured media data comprising cognitive media data, interaction information, and pose information;
   configuring, by the CIS, an immersive media streaming session, the configuring comprising:
      establishing transport sessions between the CIS and a Media Client of a Cognitive Media Client for exchange of delivery manifests associated with a plurality of immersive media scenes;
      receiving information associated with a first number of initialized media pipelines based on the delivery manifests where each initialized media pipeline is associated with a respective media stream according to the plurality of immersive media scenes;
      establishing a first number of transport sessions between the CIS and the Media Client of the Cognitive Media Client for exchange of immersive media associated with the plurality of immersive media scenes; and
      receiving information on the first number of initialized media pipelines associated with the Media Client of the Cognitive Media Client;
   processing, by the CIS, the captured media data to generate the immersive media associated with the plurality of immersive media scenes; and
   transmitting, by the CIS, the immersive media to the Media Client of the Cognitive Media Client based on the first number of media pipelines.

2. The method of claim 1, wherein the cognitive media data is generated by performing at least one of semantical perception, spatial localization, and mapping based on cognitive information and the pose information.

3. The method of claim 1, wherein the captured media data comprises standalone augmented reality (STAR) media content.

4. The method of claim 3, wherein the immersive media streaming session is created in an outer scene session loop, and
   wherein the immersive media is transmitted from the CIS to the Media Client in an inner media session loop.

5. The method of claim 1, wherein the captured media data comprises edge dependent AR (EDGAR) media content.

6. A device for cognitive immersive experiences to augmented reality (AR)/mixed reality (MR) devices, the device comprising:
   at least one memory configured to store program code; and
   at least one processor implementing a Cognitive Immersive Server (CIS), configured to read the program code and operate as instructed by the program code, the program code including:
      first receiving code configured to cause the at least one processor to receive captured media data that is associated with a plurality of scenes, the captured media data comprising cognitive media data, interaction information, and pose information;
      first configuring code configured to cause the at least one processor to configure an immersive media streaming session, the first configuring code comprising:
         establishing transport sessions between the CIS and a Media Client of a Cognitive Media Client for exchange of delivery manifests associated with a plurality of immersive media scenes;
         receiving information associated with a first number of initialized media pipelines based on the delivery manifests where each initialized media pipeline is associated with a respective media stream according to the plurality of immersive media scenes;

establishing a first number of transport sessions between the CIS and the Media Client of the Cognitive Media Client for exchange of immersive media associated with the plurality of immersive media scenes; and receiving information on the first number of initialized media pipelines associated with the Media Client of the Cognitive Media Client;

processing code configured to cause the at least one processor to process, by the CIS, the captured media data to generate the immersive media associated with the plurality of immersive media scenes; and second transmitting code configured to cause the at least one processor to transmit the cognitive media data to the Media Client of the Cognitive Media Client.

7. The device of claim 6, wherein the cognitive media data is generated by performing at least one of semantical perception, spatial localization, and mapping based on cognitive information and the pose information.

8. The device of claim 6, wherein the captured media data comprises standalone augmented reality (STAR) media content.

9. The device of claim 8, wherein the immersive media streaming session is created in an outer scene session loop, and wherein the immersive media is transmitted from the CIS to the Media Client in an inner media session loop.

10. The device of claim 6, wherein the captured media data comprises edge dependent AR (EDGAR) media content.

11. A non-transitory computer-readable medium storing instructions, the instructions comprising: one or more instructions that, when executed by one or more processors of a Cognitive Immersive Server (CIS) for delivering a cognitive immersive experiences to augmented reality (AR)/mixed reality (MR) devices, cause the one or more processors of the CIS to:

receive captured media data that is associated with a plurality of scenes, the captured media data comprising cognitive media data, interaction information, and pose information;

configure an immersive media streaming session, the configuring comprising:

establishing transport sessions between the CIS and a Media Client of a Cognitive Media Client for exchange of delivery manifests associated with a plurality of immersive media scenes;

receiving information associated with a first number of initialized media pipelines based on the delivery manifests where each initialized media pipeline is associated with a respective media stream according to the plurality of immersive media scenes;

establishing a first number of transport sessions between the CIS and the Media Client of the Cognitive Media Client for exchange of immersive media associated with the plurality of immersive media scenes; and receiving information on the first number of initialized media pipelines associated with the Media Client of the Cognitive Media Client;

process, by the CIS, the captured media data to generate the immersive media associated with the plurality of immersive media scenes; and transmit the immersive media to the Media Client of the Cognitive Media Client based on the first number of media pipelines.

12. The non-transitory computer-readable medium of claim 11, wherein the cognitive media data is generated by performing at least one of semantical perception, spatial localization, and mapping based on cognitive information and the pose information.

13. The non-transitory computer-readable medium of claim 11, wherein the captured media data comprises standalone augmented reality (STAR) media content.

14. The non-transitory computer-readable medium of claim 13, wherein the immersive media streaming session is created in an outer scene session loop, and wherein the immersive media is transmitted from the CIS to the Media Client in an inner media session loop.

15. The non-transitory computer-readable medium of claim 11, wherein the captured media data comprises edge dependent AR (EDGAR) media content.

* * * * *